US010911246B2

(12) United States Patent
Veladanda et al.

(10) Patent No.: US 10,911,246 B2
(45) Date of Patent: Feb. 2, 2021

(54) PARTITIONING CERTIFICATE REVOCATION LISTS

(71) Applicant: DigiCert, Inc., Lehi, UT (US)

(72) Inventors: Hari Veladanda, Pleasanton, CA (US); Hoa Ly, Pleasanton, CA (US); Ning Chai, San Jose, CA (US)

(73) Assignee: DigiCert, Inc., Lehi, UT (US)

( * ) Notice: Subject to any disclaimer, the term of this patent is extended or adjusted under 35 U.S.C. 154(b) by 0 days.

(21) Appl. No.: 15/851,562

(22) Filed: Dec. 21, 2017

(65) Prior Publication Data
US 2018/0123805 A1 May 3, 2018

Related U.S. Application Data

(63) Continuation of application No. 14/874,310, filed on Oct. 2, 2015, now Pat. No. 9,882,727.

(51) Int. Cl.
H04L 9/32 (2006.01)
H04L 29/06 (2006.01)

(52) U.S. Cl.
CPC .......... H04L 9/3268 (2013.01); H04L 9/3263 (2013.01); H04L 29/06775 (2013.01); H04L 63/0823 (2013.01)

(58) Field of Classification Search
CPC ............. H04L 9/3268; H04L 29/06775; H04L 9/3263; H04L 63/0823
USPC ........................................................ 713/158
See application file for complete search history.

(56) References Cited

U.S. PATENT DOCUMENTS

| 5,687,235 | A |   | 11/1997 | Perlman |  |
| 5,699,431 | A | * | 12/1997 | Van Oorschot | H04L 9/3268 380/30 |
| 5,854,981 | A |   | 12/1998 | Wallstedt |  |
| 6,128,740 | A |   | 10/2000 | Curry |  |
| 6,192,131 | B1 | * | 2/2001 | Geer, Jr. | G06F 21/33 380/247 |
| 6,202,157 | B1 | * | 3/2001 | Brownlie | G06F 21/33 709/229 |
| 6,636,975 | B1 | * | 10/2003 | Khidekel | G06F 21/32 713/156 |
| 7,047,404 | B1 | * | 5/2006 | Doonan | G06F 21/64 380/30 |

(Continued)

Primary Examiner — Tae K Kim
Assistant Examiner — Peiliang Pan
(74) Attorney, Agent, or Firm — Knobbe, Martens, Olson & Bear, LLP

(57) ABSTRACT

Certificates issued by a CA are distributed across multiple CRLs. Each certificate issued by the CA is assigned to a specific CRL, and the address of that CRL is written to the appropriate field of the certificate, such that an authenticating application can subsequently determine if the certificate is revoked. When the CA revokes a specific one of the issued certificates, it determines to which CRL the revoked certificate is assigned, and updates the specific CRL accordingly. In some embodiments, a single one of the multiple CRLs is active for assignment of certificates at any given time, and each certificate issued by the CA is assigned to the currently active CRL. In other embodiments, assignments of issued certificates are distributed between different ones of a predetermined number of multiple CRLs by applying a statistical distribution formula to each issued certificate to determine a corresponding target CRL.

14 Claims, 3 Drawing Sheets

(56) References Cited

U.S. PATENT DOCUMENTS

| | | | |
|---|---|---|---|
| 7,124,295 B1 | 10/2006 | Zhao | |
| 2001/0005841 A1* | 6/2001 | Wray | G06Q 20/3821 |
| | | | 705/76 |
| 2001/0032310 A1 | 10/2001 | Corella | |
| 2001/0047343 A1* | 11/2001 | Dahan | G06Q 20/04 |
| | | | 705/76 |
| 2004/0078564 A1* | 4/2004 | Abdulhayoglu | G06F 21/10 |
| | | | 713/156 |
| 2004/0111609 A1* | 6/2004 | Kaji | H04L 9/006 |
| | | | 713/156 |
| 2005/0065799 A1* | 3/2005 | Dare | G06F 21/6245 |
| | | | 705/50 |
| 2007/0294526 A1 | 12/2007 | Medvinsky | |
| 2008/0005339 A1* | 1/2008 | Kwan | H04L 63/0853 |
| | | | 709/229 |
| 2008/0126378 A1* | 5/2008 | Parkinson | G06F 21/33 |
| 2008/0163338 A1* | 7/2008 | Micali | G06Q 20/02 |
| | | | 726/2 |
| 2009/0187983 A1* | 7/2009 | Zerfos | H04L 63/0823 |
| | | | 726/10 |
| 2009/0210703 A1* | 8/2009 | Epstein | H04L 9/006 |
| | | | 713/157 |
| 2009/0235071 A1* | 9/2009 | Bellur | H04L 9/3268 |
| | | | 713/158 |
| 2010/0138652 A1 | 6/2010 | Sela | |
| 2010/0146250 A1* | 6/2010 | Bergerson | H04L 9/3073 |
| | | | 713/1 |
| 2010/0235606 A1* | 9/2010 | Oreland | G06F 16/2255 |
| | | | 711/173 |
| 2010/0325429 A1* | 12/2010 | Saha | H04L 63/0823 |
| | | | 713/158 |
| 2011/0213964 A1 | 9/2011 | Wnuk | |
| 2013/0031363 A1* | 1/2013 | Wnuk | H04L 9/3268 |
| | | | 713/158 |
| 2016/0034693 A1* | 2/2016 | Takeuchi | G06F 21/602 |
| | | | 713/189 |
| 2016/0087972 A1* | 3/2016 | Ahmavaara | H04L 63/0823 |
| | | | 726/10 |
| 2016/0134621 A1* | 5/2016 | Palanigounder | H04W 12/06 |
| | | | 713/156 |
| 2016/0365983 A1* | 12/2016 | Shahabuddin | H04L 9/3249 |
| 2017/0054709 A1* | 2/2017 | Benjamin | H04L 63/0823 |

\* cited by examiner

PARTITIONING CERTIFICATE REVOCATION LISTS

PRIORITY CLAIM

This application is a continuation of U.S. patent application Ser. No. 14/874,310, filed Oct. 2, 2015, entitled "PARTITIONING CERTIFICATE REVOCATION LISTS," the contents of which is hereby incorporated by reference herein in its entirety and for all purposes.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field

This disclosure pertains generally to computer security, and more specifically to managing the size of a Certificate Revocation List (CRL), through the use of partitioning.

Description of the Related Art

In the operation of cryptosystems such as public key infrastructures (PKIs), a certificate authority (CA) functions as a trusted third party. The CA issues digital certificates certifying the holding party. This allows other parties to rely on assertions or signatures made by the certificate holder. For this system to work, both the certificate holder and the party relying upon the certificate must trust the CA.

Over time, a CA revokes some issued certificates for various reasons. The CA maintains a certificate revocation list (CRL) of the certificates that have been revoked. When an application verifies a party holding a certificate, the application checks to ensure that the certificate is not on the CRL (i.e., has not been revoked). A party presenting a revoked certificate should not be trusted. To check the CRL, the verifying party uses as an address (typically a URL) in the certificate itself, which points to a CRL distribution point (CDP), at which the CRL resides. The field in the certification which holds this address is called the CDP extension. Using the CDP extension, the verifying application retrieves the CRL from the CDP, and checks the CRL to determine whether the presented certificate has been revoked.

CAs issue large numbers of certificates over time (e.g., thousands, tens of thousands). Conventionally, each certificate issued by the same CA contains the same CDP extension, which points to a single CRL. The CDP extension in an issued certificate cannot be changed unless the certificate is replaced. As the same CA issues more certificates, the CRL grows over time. A Large CRL results in decreased performance by verifying applications, due to the bandwidth and computational resources required to download and process the large list.

It would be desirable to address these issues.

SUMMARY

Up until a given initial time, certificates issued by the CA are assigned to an existing, legacy CRL. From the initial time on, certificates issued by a CA are distributed across multiple CRLs, referred to herein as partition CRLs. Each certificate issued by the CA after the initial time is assigned to a specific one of the multiple partition CRLs, and the address of that partition CRL is written to the appropriate field of the certificate, such that an authenticating application can subsequently determine if the certificate is revoked. When the CA revokes a certificate issued before the initial time, the CA updates the legacy CRL. When the CA revokes a specific one of the certificates issued after the initial time, the CA determines to which specific one of the multiple partition CRLs the revoked certificate is assigned, and updates the specific partition CRL to indicate that the certificate is revoked. Because certificates issued by the CA prior to the initialization time are assigned to the pre-existing legacy CRL, and certificates issued by the CA after the initialization time are assigned to different ones of the multiple partition CRLs, the CRL size is controlled for the existing CA, and preexisting certificates are still supported without the CA having to create a next generation of cryptographic keys or certificates.

In some embodiments, a single one of the multiple partition CRLs is active for assignment of certificates at any given time, and each certificate issued by the CA is assigned to the currently active partition CRL. New partition CRLs can be designated as active based on elapsed time (e.g., designate a new active partition CRL every six months), size of the previous active partition CRL (e.g., designate a new active partition CRL when the previous one reaches 500 KB), number of assigned certificates (e.g., designate a new active partition CRL when 110,000 certificates have been assigned to the previous one), or a combination of these factors. In such embodiments, mappings between specific ones of the multiple partition CRLs and the time ranges during which they were active is maintained. When a specific certificate is revoked, the CA can refer to the mappings to determine to which specific one of the multiple partition CRLs the revoked certificate is assigned.

In other embodiments, assignments of issued certificates are distributed between different ones of a pre-determined number of multiple partition CRLs. In these embodiments, the distributions are made by applying a statistical distribution formula to each issued certificate to determine to which specific partition CRL it is to be assigned. The formula can be a function of an identifier of the specific certificate such as its serial number and the total number of partition CRLs across which assignment of certificates is being distributed. For example, in one embodiment the statistical distribution formula comprises a subset of the digits of the serial number of the specific certificate (e.g., the last one or two digits) modulo the total number of partition CRLs.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENT

Figure 1:
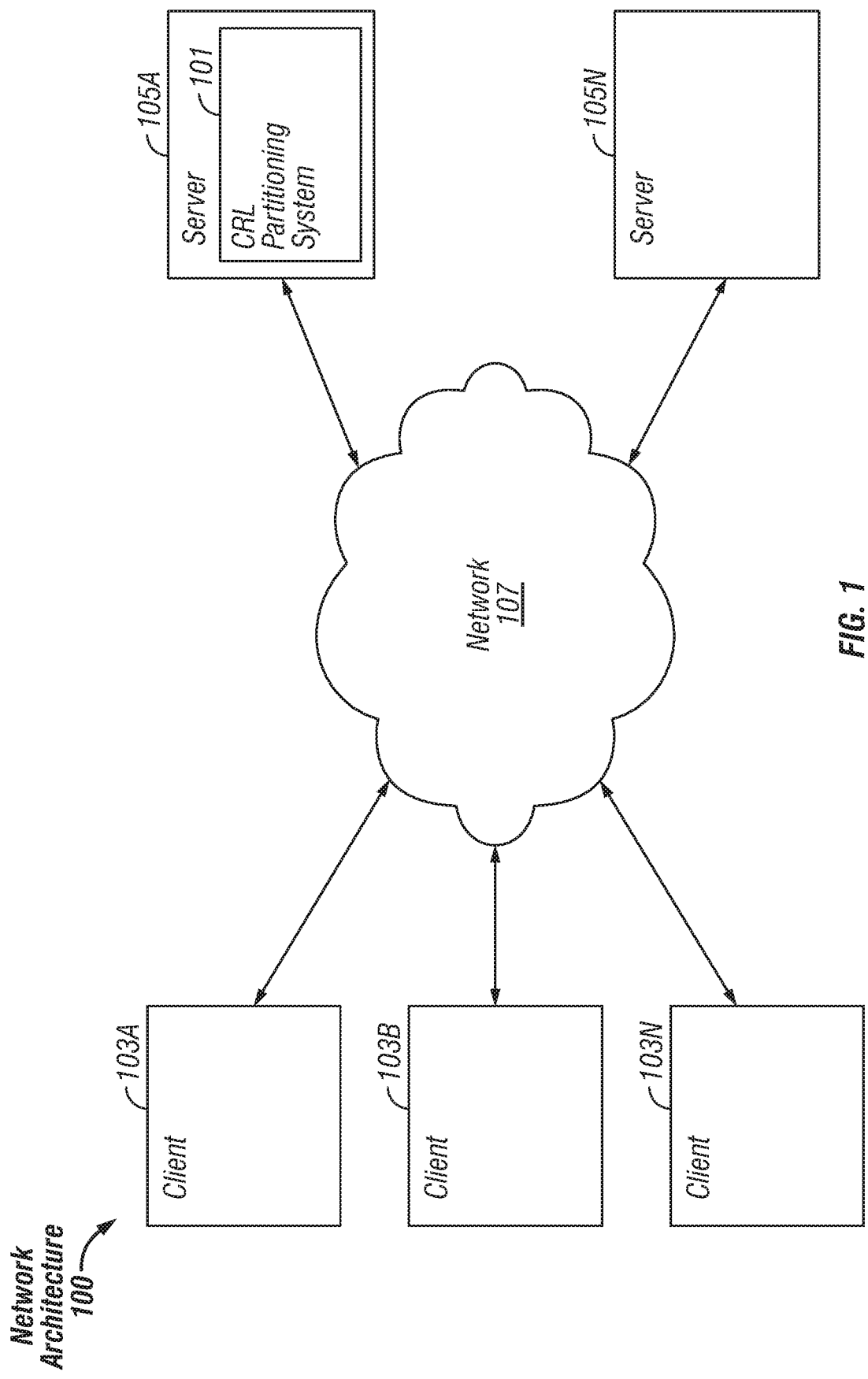
FIG. 1 is a block diagram of an exemplary network architecture in which a CRL partitioning system can be implemented, according to some embodiments.

FIG. 1 is a block diagram illustrating an exemplary network architecture 100 in which a CRL partitioning system 101 can be implemented. The illustrated network architecture 100 comprises multiple clients 103A, 103B and 103N, as well as multiple servers 105A and 105N. In FIG. 1, the CRL partitioning system 101 is illustrated as residing on server 105A. It is to be understood that this is an example only, and in various embodiments various functionalities of this system 101 can be distributed between multiple computing devices 210 as desired.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Examples of mobile computing devices are smartphones, tablets, wearable devices such as smart watches, laptop computers, etc.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
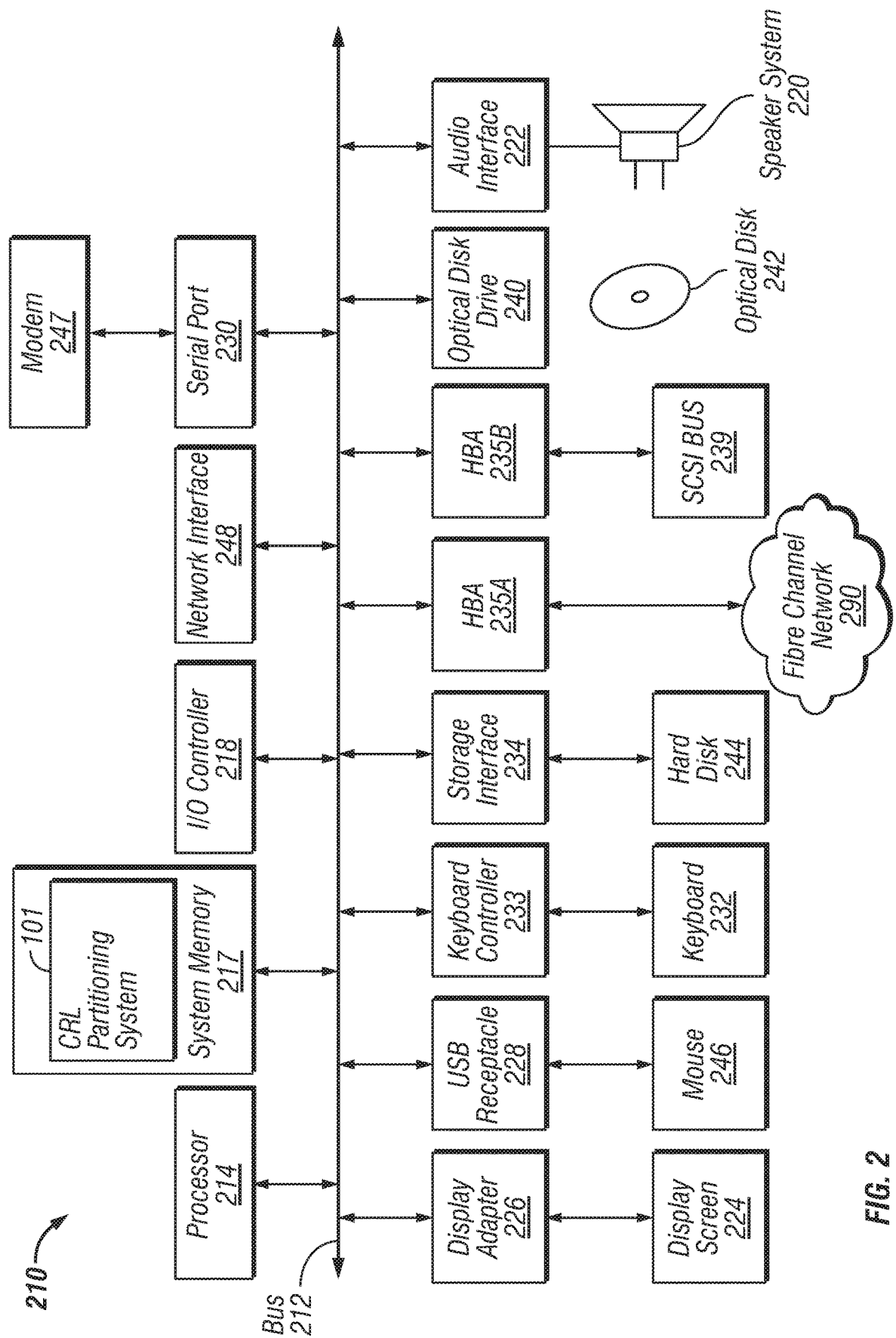
FIG. 2 is a block diagram of a computer system suitable for implementing a CRL partitioning system, according to some embodiments.

FIG. 2 is a block diagram of a computer system 210 suitable for implementing a CRL partitioning system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 241, flash memory) and loaded into system memory 217 and executed by the processor 214. Application programs can also be loaded into system memory 217 from a remote location (i.e., a remotely located computer system 210), for example via the network interface 248. In FIG. 2, the CRL partitioning system 101 is illustrated as residing in system memory 217. The workings of the CRL partitioning system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
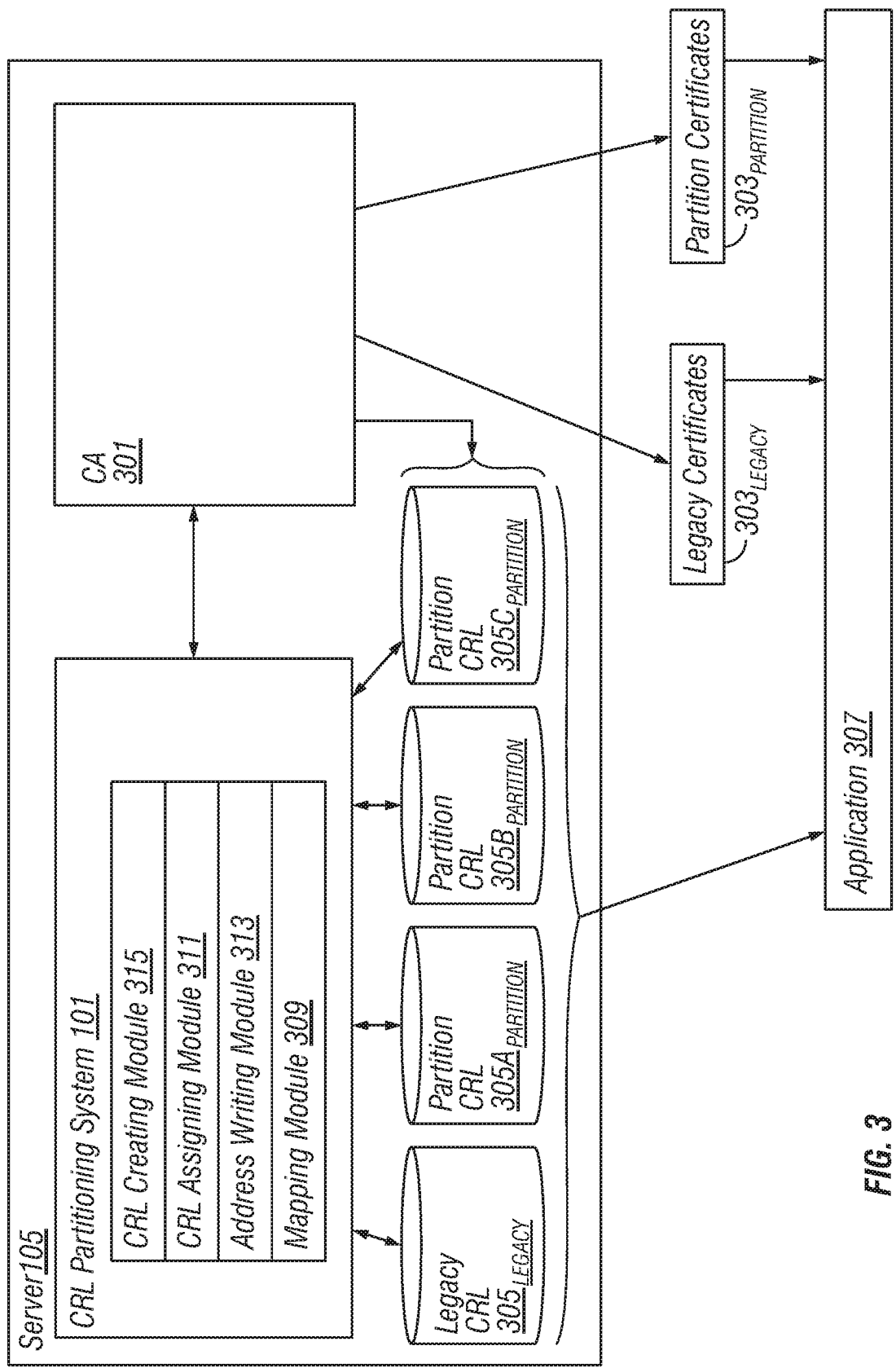
FIG. 3 is a high level block diagram of the operation of a CRL partitioning system, according to some embodiments.

FIG. 3 illustrates the operation of a CRL partitioning system 101 running on a server 105. As described above, the functionalities of the CRL partitioning system 101 can reside on specific computers 210 or be otherwise distributed between multiple computer systems 210, including within a fabric/cloud-based computing environment in which the functionality of the CRL partitioning system 101 is provided as a service over a network 107. It is to be understood that although the CRL partitioning system 101 is illustrated in FIG. 3 as a single entity, the illustrated CRL partitioning system 101 represents a collection of functionalities, which can be instantiated as a single or multiple modules as desired (instantiation of a specific, multiple module CRL partitioning system 101 is illustrated in FIG. 3). It is to be understood that the modules of the CRL partitioning system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the CRL partitioning system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

As illustrated in FIG. 3, the CRL partitioning system 101 runs on a server 105 in conjunction with a CA 301. In FIG. 3, the CRL partitioning system 101 and the CA 301 are illustrated as running on a single server 105, but these components can reside on different servers 105, and/or can each be distributed across multiple servers 105 as desired. Additionally, in FIG. 3 the CRL partitioning system 101 and the CA 301 are illustrated as being separate entities, but in some embodiments these components can be in the form of a single system providing the different described functionalities.

The CA 301 issues certificates 303, which are verified by applications 307. The verifying applications 307 can run on computing devices such as mobile or desktop clients 103 (the clients 103 are not specifically illustrated in FIG. 3). During the course of the verification process, a verifying application 307 checks to ensure that the given certificate 303 is not on the corresponding CRL 305, by using the CDP extension in the certificate 303 to access the CRL 305 and determine whether the certificate 303 has been revoked. Note that although the term "CDP extension" is used herein to refer to the certificate field containing the address of the corresponding CRL 305, different names can be used to denote this address under different certification systems, all of which are within the scope of the present invention.

The CRL partitioning system 101 enables a CA 301 to control its CRL 305 size, without having to create a next generation of cryptographic keys or certificates 303. Up until a given initial time, certificates 303 issued by the CA 301 are assigned to an existing, legacy CRL $305_{LEGACY}$. From the initial time on, the CRL partitioning system 101 provisions the certificates 303 of the CA 301 across a plurality of partition CRLs $305_{PARTITION}$. As the term is used herein, a partition CRL $305_{PARTITION}$ means a list containing a subset of the certificates 303 revoked by a given CA 301, wherein one CA 301 tracks its revoked certificates 303 across multiple partition CRLs $305_{PARTITION}$. Certificates 303 that were issued prior to an initial use of the CRL partitioning system 101 remain associated with a legacy CRL $305_{LEGACY}$, so the system 101 is backwards compatible with the use of pre-existing certificates 303. Certificates 303 issued by the CA 301 after the initialization of the CRL partitioning system 101 are distributed between multiple partition CRLs $305_{PARTITION}$, thereby controlling the size of each partition CRL $305_{PARTITION}$, and preventing the size of the legacy CRL $305_{LEGACY}$ from increasing. As a result, applications 307 use less network bandwidth, computing resources and storage space to download and process the CRL 305. The faster download time and better performance enable applications 307 to more quickly search the corresponding partition CRL $305_{PARTITION}$ and determine whether a given certificate 303 has been revoked. Smaller partition CRLs $305_{PARTITION}$ are also well suited for portable computing devices 210 such as tablets, smart phones or wearable devices, which often have limited storage space.

All certificates 303 issued by the CA 301 prior to a specific initial time are considered to be legacy certificates $303_{LEGACY}$, and contain a CDP extension with the address of the legacy CRL $305_{LEGACY}$. Thus, when an application 307 verifies a legacy certificate $303_{LEGACY}$, the legacy CRL $305_{LEGACY}$ is obtained and checked to determine whether the legacy certificate $303_{LEGACY}$ has been revoked. It is to be understood that the initial time is the specific time at which the initial use of the CRL partitioning system 101 begins. Thus, legacy certificates $303_{LEGACY}$ can be thought of as pre-existing certificates 303, or certificates 303 that have been issued by the CA 301 prior to the initial use of the CRL partitioning system 101. As described in detail below, a CRL creating module 315 of the CRL partitioning system 101 creates multiple partition CRLs $305_{PARTITION}$, and all certificates 303 issued by the CA 301 after the initialization time are distributed across these multiple partition CRLs $305_{PARTITION}$. Certificates 303 that are associated with partition CRLs $305_{PARTITION}$ are referred to herein as partition certificates $305_{PARTITION}$.

Different methodologies can be used in different embodiments to assign partition certificates $305_{PARTITION}$ to corresponding partition CRLs $305_{PARTITION}$. For example, in one embodiment partition certificates $303_{PARTITION}$ are assigned to partition CRLs $305_{PARTITION}$ based on time of issuance. More specifically, in one embodiment, when the CA 301 issues a new partition certificate $303_{PARTITION}$, a CRL assigning module 311 of the CRL partitioning system 101 assigns the new certificate $303_{PARTITION}$ to a specific, currently active partition CRL $305_{PARTITION}$ based on the issuance time of the certificate $303_{PARTITION}$. In this embodiment, only a specific single one of the partition CRLs $305_{PARTITION}$ is active at any given time, and it is to the currently active partition CRL $305_{PARTITION}$ that issued certificates $303_{PARTITION}$ are assigned. For example, for a given period of time from the initialization time X (e.g., for two months, six months, one year), all new certificates $303_{PARTITION}$ issued by the CA 301 are assigned to a first partition CRL $305A_{PARTITION}$. The specific length of the period of time is a variable design parameter. Given a period of time of length L, all certificates issued from time X until time X+L are assigned to partition CRL $305A_{PARTITION}$. Referring to time X+L as time Y, at time Y a second partition CRL $305B_{PARTITION}$ is designated as being currently active, and from time Y until time Y+L (time Z), all new certificates $303_{PARTITION}$ issued by the CA 301 are assigned to the second partition CRL $305B_{PARTITION}$. Then, at time Z a third partition CRL $305C_{PARTITION}$ is designated as being active, and from time Z to time Z+L, issued certificates $303_{PARTITION}$ are assigned to partition CRL $305C_{PARTITION}$, and so on. In one embodiment, the CRL creating module 315 creates a first partition CRL $305_{PARTITION}$ at the time the system is initialized, and then subsequent partition CRLs $305_{PARTITION}$ are created and designated as active as desired (e.g., based on elapsed time). In another embodiment, multiple partition CRLs $305_{PARTITION}$ are created at initialization time, and different ones are designated as active over time.

Recall that when an application 307 verifies a certificate 303, the application reads the CDP extension in the certificate 303 to obtain the address of the CRL 305, and searches the CRL 305 to determine whether the certificate 303 has been revoked. For this reason, when a partition certificate $303_{PARTITION}$ is assigned to a given partition CRL $305_{PARTITION}$, an address writing module 313 of the CRL partitioning system 101 writes the address of the partition CRL $305_{PARTITION}$ to the CDP extension in the certificate 303. For example, in an embodiment in which a base URL of "http://sr.symcb.com/sr.crl" is used, for each partition certificate $303_{PARTITION}$ assigned to the first partition CRL $305A_{PARTITION}$, the address writing module could write the address (in the form of a URL in this example) "http:// sr.symcb.com/sr_A.crl" to the CDP extension, for those assigned to the second partition CRL $305B_{PARTITION}$ "http://sr.symcb.com/sr_B.crl", for the third "http://sr.symcb.com/sr_C.crl", and so on. It is to be understood that the specific format of the address can vary between embodiments, as well as whether to use a base address and if so of what format, and how to denote successive partition CRLs $305A_{PARTITION}$ (e.g., letters, arabic numerals, roman numerals, etc.).

A mapping module 309 of the CRL partitioning system 101 maps the correspondence between time ranges in which certificate 303 were issued (or specific certificates 303 themselves, identified, e.g., by serial number) to the corresponding partition CRLs $305_{PARTITION}$. This mapping can be stored in conjunction with the CA 301, for example in a configuration file, database or other storage mechanism (not illustrated). When the CA subsequently revokes a specific certificate 303, it can refer to this mapping to determine to which CRL 305 the revoked certificate 303 is assigned. The CA 301 then updates the corresponding CRL 305 to indicate that the specific certificate 303 has been revoked. The exact format and content of the mapping can vary between embodiments as desired. Because each certificate 303 contains the address of its corresponding partition CRL $305_{PARTITION}$ (or that of the legacy CRL $305_{LEGACY}$, when an application 307 authenticates a certificate 303 it accesses the correct, corresponding CRL 305, and thus is able to determine whether the certificate 303 has been revoked.

Although in the above-described embodiment partition CRLs $305_{PARTITION}$ are designated as being currently active based on elapsed time (e.g., every six months), in other embodiments the volume and/or number of certificates 303 that have been issued since the last partition CRL $305_{PARTITION}$ was created or otherwise designated as active can be taken into account, singly or in combination, and with or without weighting. For example, in an embodiment in which a new active partition CRL $305_{PARTITION}$ is being designated every six months, if the rate at which new certificates 303 are issued increases and a threshold number or volume of certificates 303 have been issued within, e.g., four months, then a new partition CRL $305_{PARTITION}$ can be designated as active after four months instead of six months. Either way, in these embodiments a first partition CRL $305_{PARTITION}$ is designated as active at the time the system is initialized, and then subsequent partition CRLs $305_{PARTITION}$ are designated as active as desired based on elapsed time, size of the active partition CRL $305_{PARTITION}$ and/or number of certificates 303 issued.

In one embodiment a target size for partition CRLs $305_{PARTITION}$ is used to determine when to create new ones (or otherwise designate them as active). More specifically, the CRL creating module 315 can create a new partition CRL $305_{PARTITION}$ whenever the size of the current one reaches a specific threshold value. The specific value to use for the size threshold is a variable design parameter (e.g., 300 kilobytes, 500 kilobytes, one megabyte).

In another embodiment, the CRL creating module 315 creates new partition CRLs $305_{PARTITION}$ based on the number of certificates 303 that have been issued since the currently active partition CRL $305_{PARTITION}$ was created. Since a CRL 305 is a list of revoked certificates 303, it is the number of certificates 303 that are revoked rather than the number issued that will actually determine the size of the CRL 303. Since it is not known at the time certificates 303 are being issued and assigned to a partition CRL $305_{PARTITION}$ which or how many of the issued certificates 303 will actually be revoked, a specific percentage of the total can be used as a working estimate (e.g., 10%, 20%, 30%). It is to be understood that the percentage to use is a variable design parameter. In one embodiment, the percentage is adjusted dynamically over time, based on monitored revocation history. Where the CRL creating module 315 uses a given percentage in this capacity, the CRL creating module 315 can create a new partition CRL $305_{PARTITION}$ whenever a given number of certificates 303 have been issued such that the percentage of those certificates estimated to be revoked equals the target number of entries to include on each partition CRL $305_{PARTITION}$. This in turn is affected by the size of each entry. A CRL entry identifying a revoked certificate can include the serial number, the date of the revocation and certain other identifying information. The specific size of a CRL entry varies between embodiments (e.g., 16 bytes, 22 bytes, 44 bytes, etc.). In an embodiment with 44 byte entries with a desired partition CRL $305_{PARTITION}$ size of 500 KB and an estimated revocation percentage of 10%, the CRL creating module 315 could create a new partition CRL $305_{PARTITION}$ after the issuance of 110,000 certificates 303 (500 KB target size/44 bytes per entry=11,363, rounded down to 11,000, 11,000 is 10% of 110,000). These numbers are all just examples, and other target sizes, entry sizes, rounding protocols and/or percentages can be used as desired. As noted above, revocation estimates can also be adjusted dynamically. For example, if an estimated revocation percentage of 10% is used but over a given period of time 15% of the certificates 303 issued by the CA 301 are revoked, the percentage can be updated to 15%. How often to reset the revocation percentage and the length(s) of time periods during which empirical data concerning actual revocations is collected are variable design parameters.

In some embodiments, combinations of time since creation of the active partition CRL $305_{PARTITION}$, size of the current partition CRL $305_{PARTITION}$ and/or number of certificates 303 issued since creation of the active partition CRL $305_{PARTITION}$ are utilized to determine when to create a new partition CRL $305_{PARTITION}$. Different ones of these factors can be weighted as desired. In addition, specific issued certificates 303 or types of certificates 303 can be weighted as being more or less likely to be revoked, and this can be taken into account by the CRL creating module 315 as well.

In another embodiment, the number of partition CRLs $305_{PARTITION}$ to use is determined by the CRL partitioning system 101 prior to the assignment of partition certificates $303_{PARTITION}$, and issued certificates 303 are assigned to specific partition CRLs $305_{PARTITION}$ such that certificates 303 are distributed evenly. The specific number of pre-determined partition CRLs $305_{PARTITION}$ to use is a variable design parameter. In order to distribute issued certificates 303 evenly between the multiple partition CRLs $305_{PARTITION}$, a formula that results in a statistical distribution can be applied to each issued certificate 303 to determine to which partition CRL $305_{PARTITION}$ it is to be assigned. The specific formula to apply can vary between embodiments, but is typically a function of the serial number (or a different identifier) of the issued certificate 303 and the number of partition CRLs $305_{PARTITION}$ amongst which the certificates 303 are being distributed, such that a statistical distribution between the number of partitions is achieved (the tolerance for deviation from an equal distribution is a variable design parameter).

For example, in one embodiment the number of the partition 305 which a given certificate 303 is assigned to is calculated as being equal to the right most digit of the serial number modulo the total number of partition CRLs $305_{PARTITION}$ (e.g., PartitionNumber=(int) SerialNumber [len−1] % totalCRLCount). Modulo is a suitable operation for distribution of certificates 303 where the dividend is based on the serial number or other data derived from the certificate 303 being distributed. Where the range of divisors (the number of possible partitions) is 1-9 (i.e., in an embodiment in which there are a single digit number of partitions), it is suitable to use a single digit of the serial number of the certificate 303 as the dividend to create an even distribution. In embodiments in which there are more possible partitions (e.g., a two digit number), more digits (e.g., the last two) from the serial number of the certificate 303 can be used. This is just an example formula, and in other embodiments other formulas or variations of this one can be used to distribute issued certificates 303 between multiple CRLs 305. For example, the dividend of the modulo operation can be set to other values in different embodiments, and operations other than modulo can also be used to distribute certificates 303.

In an embodiment in which the formula given above is used, when a certificate 303 is issued the formula is applied, and the certificate 303 is assigned to the partition CRL designated by the resulting partition number. In order to write the address of the assigned partition CRL $305_{PARTITION}$ into the CDP extension in the certificate 303, the partition number (as a character) can be concatenated with a base URI as follows: base_CRL_URI||PartitionNumber||extension (|| here represents the concatenate operator).

A specific example of assigning an issued certificate 303 to a given partition CRL $305_{PARTITION}$ and writing the corresponding address to the CDP extension is now given. Where a certificate 303 with the serial number of 0x64ac622f779d166401bc838818d6e243 is issued, and the total number of partition CRLs $305_{PARTITION}$ is 5 (totalCRL-Count==5), PartitionNumber=0x43% 5=3, so the CRL assigning module 311 assigns certificate 0x64ac622f779d166401bc838818d6e243 to partition CRL 3. Where the base_CRL_URI is http://sr.symcb.com/sr_ and the extension is .crl, the address of the CRL 305 for this certificate 303 is http://sr.symcb.com/sr_3.crl, so the address writing module 313 writes this value to the CDP extension.

If this certificate 303 is later revoked, the CRL partitioning system 101 can apply the same formula to determine the partition CRL $305_{PARTITION}$ to which the certificate is assigned, and add the certificate to that partition CRL $305_{PARTITION}$. Note that no mapping need be maintained at the CRL partitioning system 101 level in this embodiment, because the same formula is used to determine to which partition CRL $305_{PARTITION}$ to assign a certificate 303 at issuance time and to which partition CRL $305_{PARTITION}$ to add the certificate 303 at revocation time. In other words, in embodiments in which issued certificates 303 are assigned to a specific partition CRL $305_{PARTITION}$ based on a distribution formula, when a given certificate 303 is revoked the CRL partitioning system 101 determines to which partition CRL $305_{PARTITION}$ the certificate 303 is assigned, and hence to which partition CRL $305_{PARTITION}$ to add the revoked certificate 303. If the certificate 303 was issued prior to the initialization time for the CRL partitioning system 101 (e.g., as determined by the certificate's beginning validity time), the certificate is a legacy certificate $303_{LEGACY}$, and it is added to the legacy CRL $305_{LEGACY}$. Otherwise, the distribution formula is applied based on the serial number of the certificate 303 as described above, to determine the specific one of the multiple partition CRLs $305_{PARTITION}$ to which the certificate 303 is assigned. The revoked certificate 303 is then added to the determined partition CRL $305_{PARTITION}$.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for managing certificate revocation list (CRL) size by distributing digital certificates issued by a certificate authority (CA) across a plurality of different CRLs based on a time at which the digital certificates are generated, the method comprising:

generating over a first period of time, using one or more computing devices associated with the CA, a first plurality of digital certificates, wherein each of the first plurality of digital certificates includes a first CRL address, wherein the first CRL address indicates a location of a first CRL, and wherein the first CRL is configured to include a first list of revoked digital certificates that identifies one or more of the first plurality of digital certificates that were generated during the first period of time;

obtaining, using the one or more computing devices, an estimated revocation percentage for the first plurality of digital certificates, wherein the estimated revocation percentage is determined prior to a digital certificate of the first plurality of digital certificates being revoked;

updating the estimated revocation percentage based on a revocation of one or more digital certificates of the first plurality of digital certificates;

generating an estimated revocation number based at least in part on the updated estimated revocation percentage and a number of digital certificates of the first plurality of digital certificates;

determining, using the one or more computing devices, to stop generating digital certificates that include the first CRL address based at least in part on the estimated revocation number satisfying a threshold number; and based on the determining to stop generating certificates that include the first CRL address, generating over a second period of time that is different from the first period of time, using the one or more computing devices, a second plurality of digital certificates, wherein each of the second plurality of digital certificates includes a second CRL address, wherein the second CRL address indicates a location of a second CRL, wherein the second CRL is configured to include a second list of revoked digital certificates that identifies one or more of the second plurality of digital certificates that were generated during the second period of time, wherein in response to revocation of a first digital certificate of the first plurality of digital certificates, an indication of the first digital certificate is added to the first list of revoked digital certificates of the first CRL based at least in part on the time at which the first digital certificate was generated, and wherein in response to revocation of a second digital certificate of the second plurality of digital certificates, an indication of the second digital certificate is added to the second list of revoked digital certificates of the second CRL based at least in part on the time at which the second digital certificate was generated.

2. The computer implemented method of claim 1, further comprising revoking, using the one or more computing devices, a second digital certificate of the first plurality of digital certificates, wherein said revoking includes updating the first list of revoked digital certificates of the first CRL to include an indication of the second digital certificate of the first plurality of digital certificates.

3. The computer implemented method of claim 1, wherein the CA is associated with a plurality of CRLs that includes the first CRL, wherein over the first period of time the first CRL is active for assignment of digital certificates and during the first period of time all other CRLs of the plurality of CRLs are inactive for assignment of digital certificates.

4. The computer implemented method of claim 3, wherein the second CRL is created after an expiration of the first period of time.

5. The computer implemented method of claim 1, wherein the CA is associated with a plurality of CRLs that includes the first CRL and the second CRL, wherein over the second period of time the second CRL is active for assignment of digital certificates and during the second period of time all other CRLs of the plurality of CRLs are inactive for assignment of digital certificates.

6. The computer implemented method of claim 1, wherein said generating the first plurality of digital certificates comprises assigning the first CRL address to each of the first plurality of digital certificates, wherein said generating the second plurality of digital certificates comprises assigning the second CRL address to each of the second plurality of digital certificates.

7. The computer implemented method of claim 1, wherein the second period of time occurs after an expiration of the first period of time.

8. A non-transitory computer readable medium for managing certificate revocation list (CRL) size by distributing digital certificates issued by a certificate authority (CA) across a plurality of different CRLs based on a time at which the digital certificates are generated, the non-transitory computer readable medium storing computer executable instructions that, when loaded into computer memory and executed by a processor of a computing device, cause the computing device to perform steps, the steps including:

generating over a first period of time, using one or more computing devices associated with the CA, a first plurality of digital certificates, wherein each of the first plurality of digital certificates includes a first CRL address, wherein the first CRL address indicates a location of a first CRL, and wherein the first CRL is configured to include a first list of revoked digital certificates that identifies one or more of the first plurality of digital certificates that were generated during the first period of time;

obtaining, using the one or more computing devices, an estimated revocation percentage for the first plurality of digital certificates, wherein the estimated revocation percentage is determined prior to a digital certificate of the first plurality of digital certificates being revoked;

updating the estimated revocation percentage based on a revocation of one or more digital certificates of the first plurality of digital certificates;

generating an estimated revocation number based at least in part on the updated estimated revocation percentage and a number of digital certificates of the first plurality of digital certificates;

determining, using the one or more computing devices, to stop generating digital certificates that include the first CRL address based at least in part on the estimated revocation number satisfying a threshold number; and based on the determining to stop generating certificates that include the first CRL address, generating over a second period of time that is different from the first period of time, using the one or more computing devices, a second plurality of digital certificates, wherein each of the second plurality of digital certificates includes a second CRL address, wherein the second CRL address indicates a location of a second CRL, wherein the second CRL is configured to include a second list of revoked digital certificates that identifies one or more of the second plurality of digital certificates that were generated during the second period of time, wherein in response to revocation of a first digital certificate of the first plurality of digital certificates, an indication of the first digital certificate is added to the first list of revoked digital certificates of the first CRL based at least in part on the time at which the first digital certificate was generated, and wherein in response to revocation of a second digital certificate of the second plurality of digital certificates, an indication of the second digital certificate is added to the second list of revoked digital certificates of the second CRL based at least in part on the time at which the second digital certificate was generated.

9. The non-transitory computer readable medium of claim 8, wherein the steps further include:

revoking, using the one or more computing devices, a second digital certificate of the first plurality of digital certificates, wherein said revoking includes updating the first list of revoked digital certificates of the first CRL to include an indication of the second digital certificate of the first plurality of digital certificates.

10. The non-transitory computer readable medium of claim 8, wherein the CA is associated with a plurality of CRLs that includes the first CRL, wherein over the first period of time the first CRL is active for assignment of digital certificates and during the first period of time all other CRLs of the plurality of CRLs are inactive for assignment of digital certificates.

11. The non-transitory computer readable medium of claim 10, wherein the second CRL is created after an expiration of the first period of time.

12. The non-transitory computer readable medium of claim 8, wherein the CA is associated with a plurality of CRLs that includes the first CRL and the second CRL, wherein over the second period of time the second CRL is active for assignment of digital certificates and during the second period of time all other CRLs of the plurality of CRLs are inactive for assignment of digital certificates.

13. The non-transitory computer readable medium of claim 8, wherein said generating the first plurality of digital certificates comprises assigning the first CRL address to each of the first plurality of digital certificates, wherein said generating the second plurality of digital certificates comprises assigning the second CRL address to each of the second plurality of digital certificates.

14. The non-transitory computer readable medium of claim 8, wherein the second period of time occurs after an expiration of the first period of time.

\* \* \* \* \*